US009652427B2

(12) United States Patent
Ryu

(10) Patent No.: US 9,652,427 B2
(45) Date of Patent: May 16, 2017

(54) PROCESSOR MODULE, MICRO-SERVER, AND METHOD OF USING PROCESSOR MODULE

(71) Applicant: Samsung Electronics Co., Ltd, Suwon-si, Gyeonggi-do (KR)

(72) Inventor: Ha-uk Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 617 days.

(21) Appl. No.: 14/148,962

(22) Filed: Jan. 7, 2014

(65) Prior Publication Data

US 2014/0195712 A1 Jul. 10, 2014

(30) Foreign Application Priority Data

Jan. 7, 2013 (KR) .................... 10-2013-0001768
Dec. 2, 2013 (KR) .................... 10-2013-0148406

(51) Int. Cl.
*G06F 3/00* (2006.01)
*G06F 13/40* (2006.01)
(52) U.S. Cl.
CPC .................... *G06F 13/4022* (2013.01)
(58) Field of Classification Search
None
See application file for complete search history.

(56) References Cited

U.S. PATENT DOCUMENTS

| 8,438,429 B2 * | 5/2013 | Takada .............. G06F 11/2089 714/702 |
| 2008/0259555 A1 | 10/2008 | Bechtolsheim et al. |
| 2010/0042810 A1 | 2/2010 | Yao et al. |
| 2011/0059630 A1 | 3/2011 | Tanaka |
| 2012/0185579 A1 | 7/2012 | Watanabe |

FOREIGN PATENT DOCUMENTS

KR  10-2013-0001169  1/2013

OTHER PUBLICATIONS

Search Report dated Apr. 9, 2014 issued in International Application No. PCT/KR2013/011776.
Written Opinion dated Apr. 9, 2014 issued in International Application No. PCT/KR2013/011776.

* cited by examiner

*Primary Examiner* — Cheng-Yuan Tseng
(74) *Attorney, Agent, or Firm* — Staas & Halsey LLP

(57) ABSTRACT

A processor module includes at least one storage device, at least one central processing unit (CPU) that uses a preset interface, and a module controller to relay a connection between a common interface bus formed on the based board and an interface used by the CPU.

18 Claims, 17 Drawing Sheets

PROCESSOR MODULE, MICRO-SERVER, AND METHOD OF USING PROCESSOR MODULE

CROSS-REFERENCE TO RELATED APPLICATIONS

This application claims priority under 35 U.S.C. §119 from Korean Patent Application No. 10-2013-0001768 and No. 10-2013-0148406, filed on Jan. 7, 2013 and Dec. 2, 2013 respectively, in the Korean Intellectual Property Office, the disclosure of which is incorporated herein by reference in its entirety.

BACKGROUND OF THE INVENTION

1. Field of the Invention

The present general inventive concept generally relates to providing a processor module, a micro-server, and a method of using the processor module, and more particularly, to providing a processor module that enables a plurality of different types of processor modules to be used mixed with one another in a server system, the server system, and a method of using the processor module.

2. Description of the Related Art

Recent advancements in high-speed Internet and Intranet technologies have resulted in new developments in server technologies to process large amounts of data at high speeds. As a result, a rack-mount cluster server technology has been developed. However, a rack-mount cluster server has a large volume and a large amount of power consumption, and an extension of a system is limited by connections of processor modules to one another through a cable.

A processor module refers to a server that is developed to solve the above-described problem, i.e., a thin modularized extension server that is inserted into a body of a micro-server system to operate without horizontally piling a rack server, such as a rack-mount server. In an instance where a large number of servers are inserted and installed in a narrow space, the processor module is also referred to as a high-density server, includes core elements of a server such as one or more central processing units (CPUs), a memory unit, an operating system (OS), etc., and is supported by power, inputs and outputs, a subordinate device, and various types of control functions from the body to operate as the server.

However, a conventional interface is designed to use only same types of processor modules, i.e., only processor modules in which the same types of CPUs are installed, which are installed in one micro-server. Therefore, an additional micro-server is to be installed to use processor modules in which different types of CPUs are installed.

SUMMARY OF THE INVENTION

The present general concept provides a processor module that enables various types of processor modules to be used in one micro-server, the micro-server, and a method of using the processor module.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a processor module which is installable on a base board of a micro-server. The processor module may include: at least one storage device; at least one central processing unit (CPU) which uses a preset interface; and a module controller which relays a connection between a common interface bus formed on the based board and an interface used by the CPU.

The module controller may convert a signal received through the common interface bus so that the signal corresponds to the preset interface and convert a signal received from the CPU so that the signal corresponds to the common interface bus. The common interface bus may be an interface bus which commonly connects a main controller formed on the base board to a plurality of different types of processor modules.

The module controller may include: a common control interface which is connected to the common interface bus to receive and transmit a signal comprising at least one of a control command and data; a controller which converts a signal received through the common interface bus so that the signal corresponds to the preset interface and converts a signal received from the CPU so that the signal corresponds to the common interface bus; and a module interface which is connected to the CPU and the storage device to receive and transmit a signal corresponding to the preset interface.

The common interface bus may be an interface bus which supports at least one of an Inter-Integrated circuit ($i^2c$) interface and a peripheral component interconnect (PCI)-Express interface.

The processor module may perform a predefined calculation according to control of the CPU, and may further include a DSP and/or a graphic user interface (GPU), which provides the CPU with the calculated result.

According to another aspect of the exemplary embodiments, there is provided a micro-server including: a main controller; a base board on which the main controller is mounted; a common interface bus which is formed on the based board; and a plurality of different types of processor modules which are installed on the based board to be connected to the main controller through the common interface bus. The plurality of processor modules may include module controllers which relay connections between the common interface bus and an interface used by CPUs mounted in the processor modules.

The module controllers may convert a signal received through the common interface bus so that the signal corresponds to the interface and convert a signal received from the CPUs so that the signal corresponds to the common interface bus.

The common interface bus may be an interface bus which supports at least one of an $i^2c$ interface and a PCI-Express interface.

The plurality of processor modules may be designed so that slots and forms of connection pins are equal.

The main controller may receive status information from the plurality of processor modules.

The status information may include at least one of types of the CPUs of the processor modules, the number of CPUs, bootloader information. The main controller may transmit an administration server to the status information.

The micro-server may further include: a Switched Mode Power Supply (SMPS) which selectively supplies power to elements of the micro-server. The main controller may control the SMPS to calculate used voltages and power consumptions of the processor modules by using the status information and supply power according to the used voltages and the power consumptions of the processor modules.

The micro-server may further include: an Input/Output (I/O) device which includes at least one I/O card which receives and transmits data with an external device; and a switch device which selectively connects the I/O device to the plurality of processor modules.

The switch device may include PCI-Express switch circuits to selectively adjust connection relations between the plurality of processor modules and the at least one I/O card.

The main controller may receive a control command from the administration server to control the plurality of processor modules.

If a sleep mode command is received from the administration server, the main controller may control to cut off power of the processor modules of the plurality of processor modules which are not used and to reduce clock speeds of CPUs of the processor modules which are used.

Meanwhile, at least one of the plurality of processor modules may perform a predefined calculation according to the control of the CPU, and may further include the DSP and/or the GPU, which provides the CPU with the calculated result.

The common interface bus may be connected to a storage system including at least one storage device, and relay connections between each of the plurality of processor modules and the storage system.

According to another aspect of the exemplary embodiments, there is provided a method of using a processor module of a micro-server which includes a based board on which a main controller is mounted, a common interface bus formed on the based board, and the processor module installed on the base board to be connected to the common interface bus. The method may include: if a module controller of the processor module receives a first signal through the common interface bus formed on the base board, converting the first signal so that the first signal corresponds to an interface used by a CPU mounted in the processor module and transmits the converted first signal to the CPU; and if the CPU outputs a second signal, converting the second signal so that the second signal corresponds to the common interface bus, through the module controller and transmitting the converted second signal from the module controller to the main controller through the common interface bus.

The common interface bus may be an interface bus which supports at least one of an $i^2c$ interface and a PCI-Express interface.

According to another aspect of the exemplary embodiments, there is provided a non-transitory computer-readable recording medium executing the method.

BRIEF DESCRIPTION OF THE DRAWINGS

The above and/or other aspects will be more apparent by describing certain exemplary embodiments with reference to the accompanying drawings, in which.

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
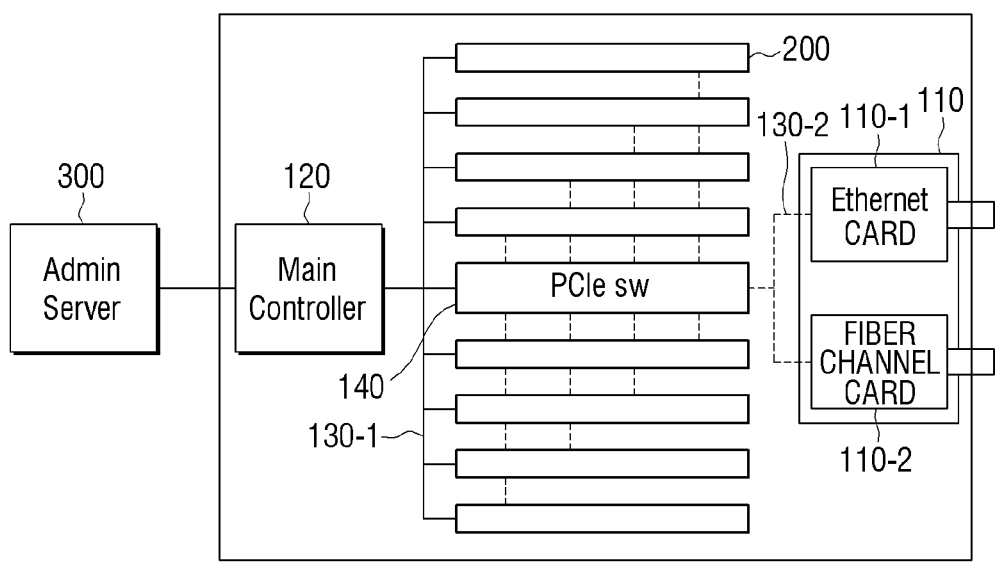
FIG. 1 is a block diagram illustrating a structure of a micro-server according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a micro-server 100 (or server system) according to an exemplary embodiment of the present general inventive concept.

Referring to FIG. 1, the micro-server 100 includes an Input/Output (I/O) device 110, a main controller 120, a common interface bus 130, a switch device 140, and a plurality of processor modules 200.

The I/O device 110 includes at least one I/O card to transmit data outside the micro-server 100 to an external device 400. The I/O card may include an Ethernet card 110-1, a fiber channel card 110-2, etc., but is not limited thereto.

The I/O device 110 may receive data from or transmit data to an external device, an external network, etc., but is not limited thereto.

The data may be received from and transmitted to the plurality of processor modules 200 through a peripheral component interconnect (PCI)-Express interface, and connections to the processor modules 200 may be controlled by the switch device 140. The switch device 140 will be described in detail later.

The main controller 120 controls components within the micro-server 100.

In detail, the main controller 120 controls the switch device 140 to transmit the data received from the I/O device 110 to the processor modules 200 by using the common interface bus 130. The main controller 120 also transmits a control command received from an administration server 300 to the processor modules 200 by using the common interface bus 130.

The main controller 120 controls the processor modules 200 installed in the micro-server 100 to form a system that is specialized to include a web server, a file transfer protocol (FTP) server, a mail server, a database (DB) server, etc. For example, if the main controller 120 is used as a web server that is simultaneously accessed by many users, the main controller 120 allows processor modules to be used to access a webpage or uses a web caching processor module connected through a high-speed Internet connection network in order to process the users' accesses more quickly.

The main controller 120 receives status information from the processor modules 200 installed in the micro-server 100.

The status information of the processor modules 200 may include at least one of CPU types of the processor modules 200, a number of CPUs, and bootloader information.

The main controller 120 transmits the received status information to the administration server 300. In this case, the administration server 300 displays a status of the micro-server 100 to an administrator or a user by using the status information of the processor modules 200 and selects an appropriate processor module 200 from among various types of the processor modules 200 to allocate resources.

The common interface bus 130 is an interface device that allows the elements of the micro-server 100 to interface with one another. The elements of the micro-server 100 interface with one another in parallel to perform a two-way communication or a half-duplex communication under control of the main controller 120. In detail, the common interface bus 130 includes an interface bus 130-1 to connect control command signals to one another and an interface bus 130-2 to connect data signals to one another.

The common interface bus 130 may support at least one of an Inter-Integrated Circuit ($i^2c$) interface and a PCI-Express interface. According to an exemplary embodiment of the present general inventive concept, the interface bus 130-1 that connects the control command signals to one another may be realized as an $i^2c$ interface bus, and the interface bus 130-2 that connects the data signals to one another may be combined to form a PCI-Express interface bus.

The $i^2c$ interface bus refers to a bus standard developed to allow communication between a CPU and a low-speed peripheral device. Also, the $i^2c$ interface bus uses two strands of lines and thus is also referred to as a Two Wire Interface (TWI). The $i^2c$ interface bus is a synchronous communication method that includes a clock signal and a data signal to enable a two-way communication with a master device regardless of the number of slave devices. Also, one bus may include two or more master devices, and slave devices may be added and/or removed even when the $i^2c$ interface bus operates.

The micro-server 100 according to an exemplary embodiment of the present general inventive concept may transmit a control command to the processor modules 200 through the $i^2c$ interface bus of the common interface bus 130 under control of the main controller 120.

The PCI-Express interface bus refers to a local bus standard that maintains a software compatibility with a conventional PCI parallel interface bus and has an improved serial structure resulting in high-speed input and output between devices. The PCI-Express interface bus may process a large amount of data. Therefore, the micro-server 100 according to an exemplary embodiment of the present general inventive concept may transmit data to the processor modules 200 through the PCI-Express interface bus of the common interface bus 130 under control of the main controller 120.

In detail, data received from the I/O device 110 may be transmitted to the processor module 200 selected by the switch device 140 through the PCI-Express interface bus. The switch device 140 may select the processor module 200 to which data is to be transmitted under control of the main controller 120.

As described above, the micro-server 100 of the present general inventive concept is designed as a preset common interface bus regardless of types of the processor modules 200 installed in the micro-server 100. The types of the processor modules 200 will be described in detail later together with descriptions of the processor modules 200.

The switch device 140 selectively connects the plurality of processor modules 200 to the I/O device 110. In detail, the switch device 140 selects one of the plurality of modules 200 and connects the selected processor module 200 to the I/O device 110 to transmit data received from the I/O device 110 to the selected processor module 200 under control of the main controller 120.

The switch device 140 may include PCI-Express switch circuits (or Mutual Recognition Arrangement (MRA)_PCIe switches to selectively adjust a connection relation between the plurality of processor modules 200 and at least one I/O card.

The switch device 140 may include an I/O virtualization technology. The I/O virtualization technology refers to a technology that allows simultaneously use of one I/O card in several processor modules (or CPU boards).

The switch device 140 may adjust a connection structure between the processor modules 200 and the I/O device 110 without changing physical positions of the I/O device 110 and the processor modules 200.

The processor modules 200 are connected to the main controller 120 through the common interface bus 130. In detail, the processor modules 200 include module controllers to relay a connection between the common interface bus 130 and an interface used by CPUs installed in the processor modules 200. The processor modules 200 will be described in detail later with reference to FIG. 2.

As described above, the processor modules 200 refer to high-density servers that may be installed in the micro-server 100. A large number of processor modules may be inserted into and installed within the micro-server 100 in a narrow space and may include core elements of servers such as one or more CPUs, storage devices, OSs, etc. The processor modules 200 are supported by power, inputs and outputs, and various types of control functions from the micro-server 100 to operate as servers.

The micro-server of the present general inventive concept supports different types of processor modules 200 through the common interface bus 130. Different types of processor modules 200 may be installed in one micro-server 100 to improve an availability of the micro-server 100.

For example, if the micro-server 100 having a high performance is required, a large number of processor modules 200 including high-performance CPUs may be installed. If the micro-server 100 having low power is required, a large number of processor modules 200 including low-power CPUs may be installed. Therefore, the availability of the micro-server 100 may be maximized.

The types of the processor modules 200 are defined according to types of CPUs installed in the processor modules 200.

For example, a processor module including an Intel® type CPU may be defined as an Intel type processor module, and a processor module including an ARM® type CPU may be defined as an asynchronous response mode (ARM) type processor module. In general, the ARM type processor module is specialized for low power, and the Intel type processor module is specialized for high performance. Therefore, if a user wants to use the micro-server 100 having a high performance, the user may install and use a large amount of Intel type processor modules. If the user wants to use the micro-server 100 having low power, the user may install and use a large amount of ARM type processor modules.

Therefore, processor modules including high-performance CPUs and processor modules including low-power CPUs may both be installed in one micro-server 100 according to a selection of the user.

Detailed structures of the processor modules 200 will now be described in detail with reference to FIGS. 2 through 7.

FIGS. 2 through 7 are block diagrams illustrating structures of the plurality of processor modules 200 according to exemplary embodiments of the present general inventive concept.

Figure 2:
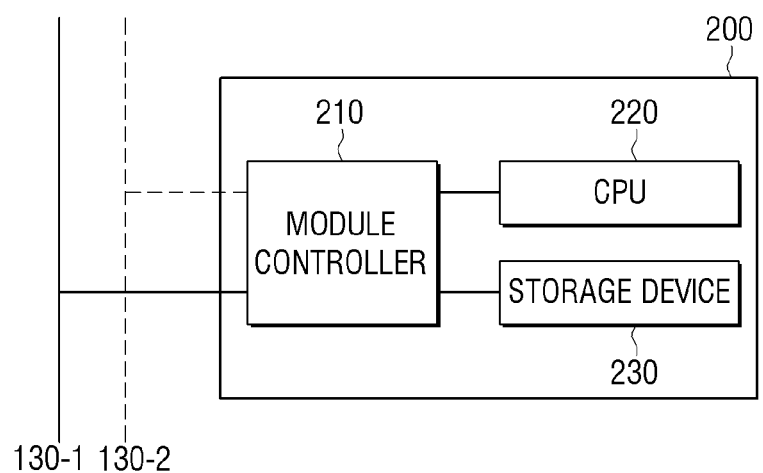
FIGS. 2 through 7 are block diagrams illustrating structures of processor modules according to exemplary embodiments of the present general inventive concept.

Referring to FIG. 2, the processor module 200 includes a module controller 210, a CPU 220, and a storage device 230. The processor module 200 may be installed on a base board of the micro-server 100.

The module controller 210 is connected to the common interface bus 130 to relay a connection between the common interface bus 130 and an interface used by the CPU 220 of the processor module 200. In detail, the processor module 200 is designed as an interface corresponding to the CPU 220. Therefore, in order to communicate with the common interface bus 130 of the micro-server 100, the module controller 210 may convert a control command and data according to an interface protocol corresponding to the CPU 220.

The module controller 210 is connected to a bus interface unit (BIU) of the CPU 220 to receive and transmit the control command and the data.

For example, if the CPU 220 of the processor module 200 is an Intel® type, the module controller 210 receives a control command from the main controller 120 of the micro-server 100 through the i²c interface bus 130-1, converts the control command into an interface having a standard corresponding to the Intel® type CPU 220, and provides the interface to the CPU 220 and the storage device 230. The module controller 210 receives data from the I/O device 110 through the PCI-Express interface bus 130-2, converts the data according to the same method as that by which the control command is converted, and provides the converted data to the CPU 220 and the storage device 230.

The module controller 210 includes firmware used to control the CPU 220 of the processor module 200 to control elements of the processor modules 200

The CPU 220 is a CPU of the processor module 200 that deciphers the control command and performs an arithmetic and logical operation or processes data. The CPU 220 includes the BIU to communicate with an external device An architecture of the CPU 220 may vary according to manufacturers. The architecture may vary according to a basic structure, a design method, a manufacturing process of the CPU 220, a clock speed, a number of cores, a capacity of a cache, the BIU, etc. but is not limited thereto. Therefore, an interface standard is defined and used according to the architecture of the CPU 220 varying according to the manufacturers, and thus the CPU 220 of another manufacturer may not be used together within the processor module 200.

Figure 3:
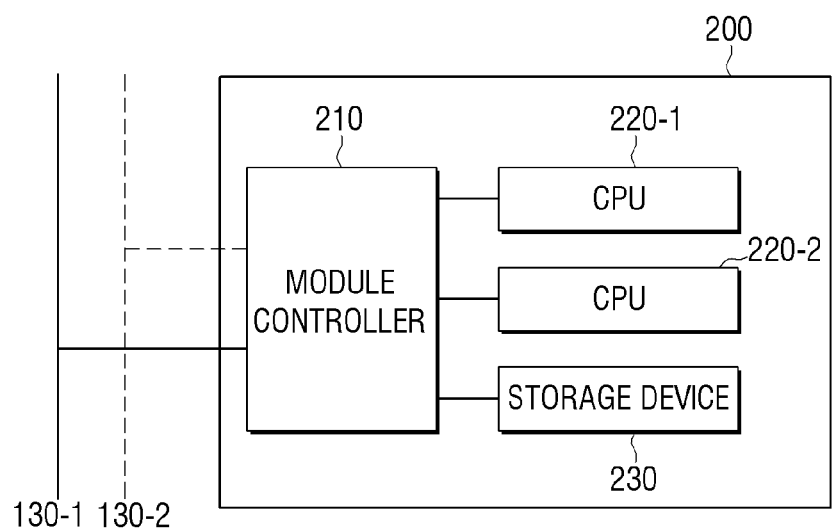

For example, as illustrated in FIG. 3, a plurality of CPUs 220-1 and 220-2 may be installed in one processor module 200. However, since an interface within the processor module 200 is designed to be unified, the plurality of CPUs 220-1 and 220-2 may be of a same type of CPU as designed by a same manufacturer.

As such, the plurality of CPUs 220-1 and 220-2 may respectively operate independent OSs under control of one module controller 210.

Figure 4:
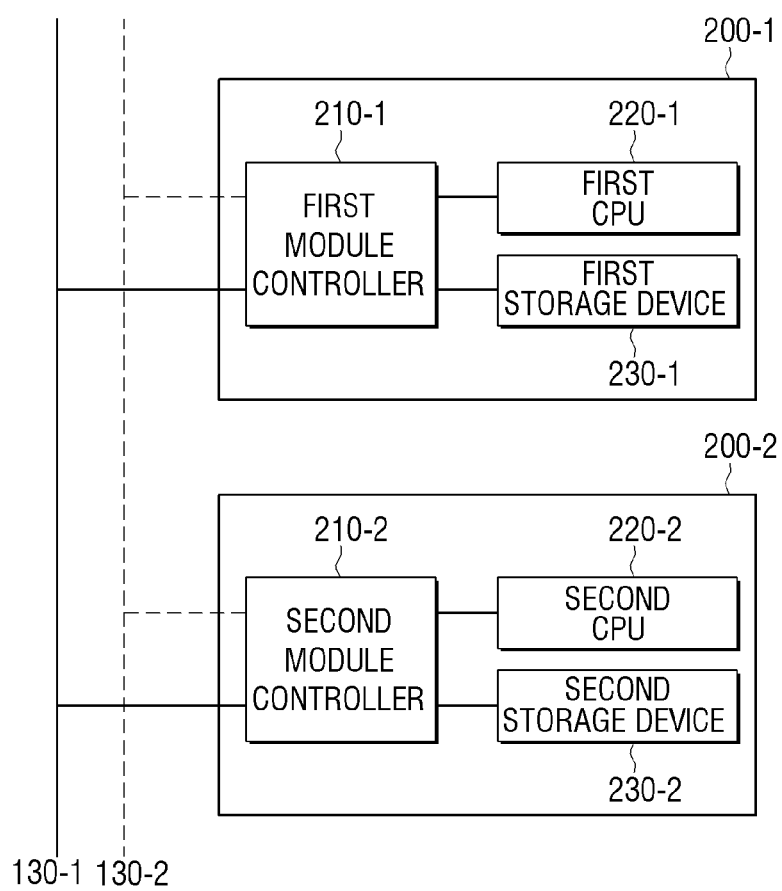

If the module controller 210 is included as illustrated in FIG. 4, the micro-server 100 may be connected to the processor module 200 including different types of CPUs according to an unified interface standard by using the common interface bus 130.

For example, referring to FIG. 4, a first processor module 200-1 is connected to a second processor module 200-2 having a different type from the first processor module 200-1 via the common interface bus 130 of the micro-server 100. In detail, a first CPU 220-1 is installed in the first processor module 200-1, and a second CPU 220-2 having a different type from the first CPU 220-1 is installed in the second processor module 200-2. Therefore, a first module controller 210-1 converts a control command and data transmitted from the common interface bus 130 so that the control command the data appropriately to respond to an interface standard corresponding to the first CPU 220-1 and provides the converted control command and data to the first CPU 220-1 and a first storage device 230-1. The second module controller 210-2 converts the control command and the data transmitted from the common interface bus 130 so that the control command and the data appropriately correspond to an interface standard corresponding to the second CPU 220-2 and provides the converted control command and data to the second CPU 220-2 and a second storage device 230-2.

Accordingly, different types of first and second processor modules 200-1 and 200-2 as described above may be installed in the micro-server 100 including the common interface bus 130 to operate as servers.

Meanwhile, although it was described that the processor module 200 includes the module controller 210, the CPU 220, and the storage device 230 by default, the storage device 230 may be installed on an external device in implementation, and may be designed to further include various types of devices so as to be optimized for a particular use. For example, a DSP or a GPU is a device suitable to process materials for a particular use, and may operate by being connected to a CPU which instructs an operation, not operate autonomously. Accordingly, when it is necessary to optimize the processor module 200 for a particular operation, it is possible to implement the processor module by combining a CPU, a DSP, and a GPU so as to be appropriate for the use. This example is described by referring to FIG. 5 and FIG. 6.

Figure 5:
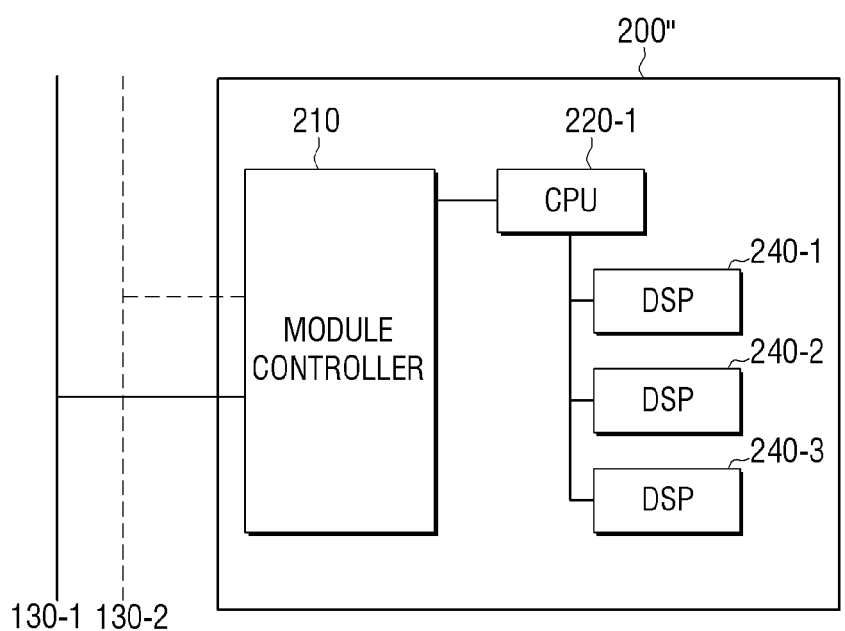

As an example, referring to FIG. 5, a processor module 200" includes the module controller 210, the CPU 220, and a plurality of DSPs 240-1, 240-2, and 240-3. To be specific, the plurality of DSPs 240-1, 240-2, and 240-3 may perform a predefined calculation according to the control of the CPU 220, and may provide the CPU 220 with the calculated result. Meanwhile, although the present example illustrates that the processor module 200" includes three DPSs, it is obvious that the processor module 200" may include one DPS, two DPSs, or four or more DPSs in implementation.

Figure 6:
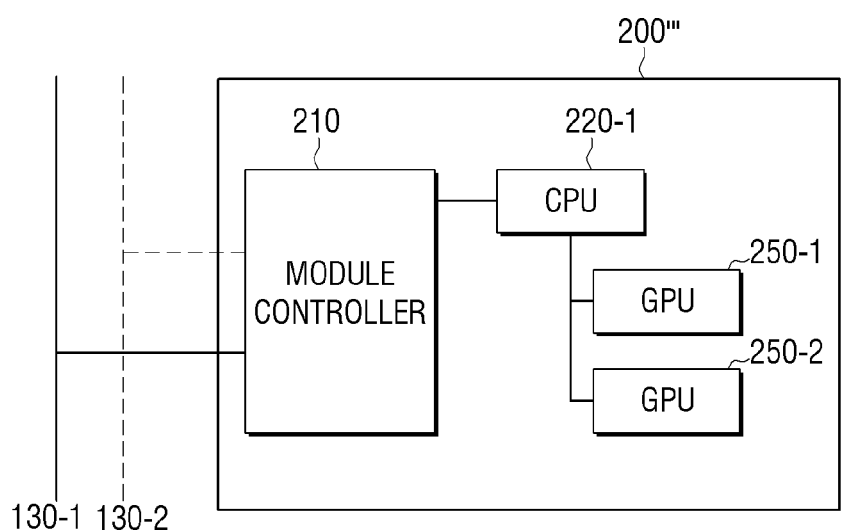

In addition, referring to FIG. 6, a processor module 200''' includes the module controller 210, the CPU 220, and a plurality of GPUs 250-1 and 250-2. In detail, the plurality of GPUs 250-1 and 250-2 may perform a predefined calculation according to the control of the CPU 220, and may provide the CPU 220 with the calculated result. Meanwhile, although the example illustrates that the processor module 200''' includes three GPUs, it is obvious that the processor module 200'''' may include one GPU or three or more GPUs in implementation.

In addition, FIG. 5 and FIG. 6 illustrate that the processor module further includes only a DSP or only a GPU, but a single processor module may include both of the DSP and the GPU in implementation.

The aforementioned processor module is a module type in which all storage devices are embedded, and the CPU 220 may access to only the storage device 230 embedded in its own processor module. In addition, in order for the CPU 220 to access to a storage device embedded in other processor module, supports of an operating system which is executed in the processor module is required. In order to resolve such problem, a storage device may be connected to an I/O board which is connectable to various types of processor modules so that a plurality of processor modules may share the single storage unit.

Figure 7:
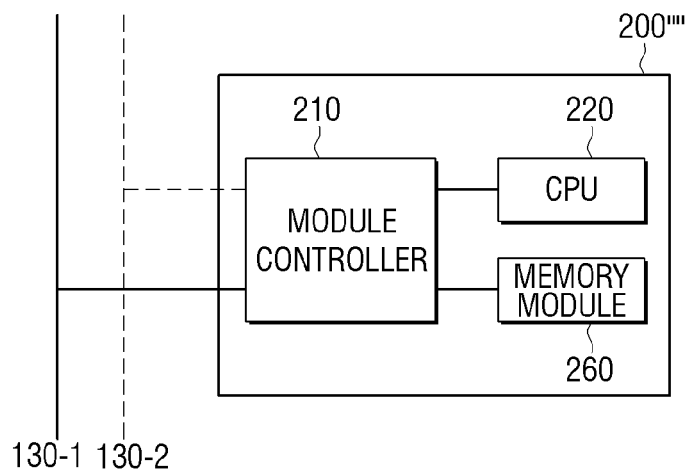

Referring to FIG. 7, a processor module 200''' includes the module controller 210, the CPU 220, and a memory 260. To be specific, referring to FIG. 7, unlike the aforesaid exemplary embodiments, the processor module 200''' does not include a storage device. That is, the processor module 200''' according to the present exemplary embodiment operates by using a storage device disposed outside the processor module. Meanwhile, although it was described that a storage device is disposed inside the micro-server 100, a storage device may be disposed on a separate device which exists outside the micro-server in implementation. This example will be described below by referring to FIG. 10.

Hereinabove, it was described that the memory 260 is not disposed on other processor module 200''' while being disposed in the example, but it is common that a memory element is used in operations of a CPU, and thus, the memory 260 is not illustrated in the preceding drawings to simplify the drawings.

Meanwhile, when the module controller 210 is provided as recited in the present general inventive concept, the micro-server 100 may be connected to the processor module 200 having different types of CPUs through unified interface standards by using the designed common interface bus 130.

Figure 8:
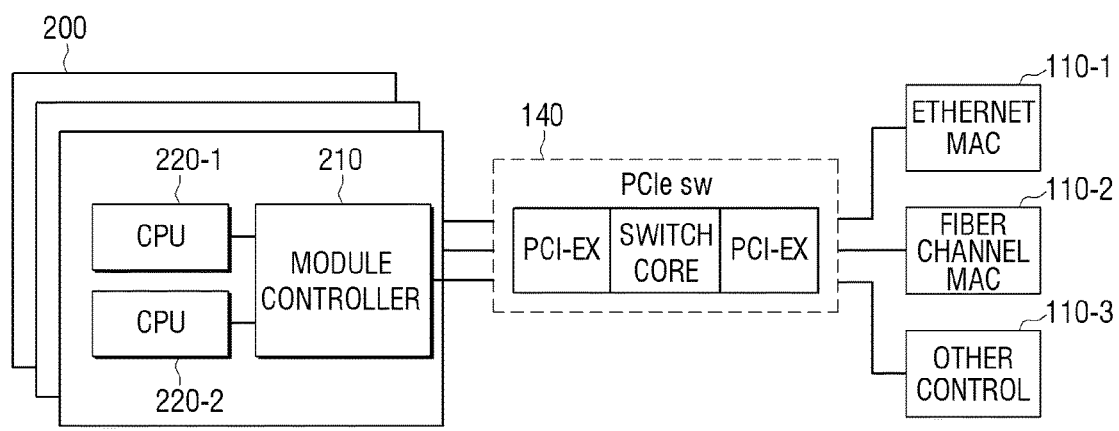
FIG. 8 is a block diagram illustrating an input/output (I/O) virtualization operation according to an exemplary embodiment of the present general inventive concept.

FIG. 8 is a block diagram illustrating an I/O virtualization operation according to an exemplary embodiment of the present general inventive concept. As described above, the I/O virtualization operation refers to a technology to simultaneously use one I/O card in several processor modules 200 (or CPU boards). Also, similar to FIG. 3, a module controller 210 connected to a plurality of CPUs 220-1 and 220-2 may be included in the processor modules 200.

The switch device 140 may selectively connect the plurality of processor modules 200 to the I/O device 110. In detail, the switch device 140 may select one of the plurality of processor modules 200 and connect the selected processor module 200 to the I/O device 110 to transmit data received from the I/O device 110.

The switch device 140 may include PCI-Express switch circuits (or MRA PCIe switches) may selectively adjust connection relations between the plurality of processor modules 200 and at least one of a plurality of I/O cards 110-1, 110-2, and 110-3 through a switch core configuration. An I/O virtualization technology that enables the plurality of processor modules 200 to share an I/O card may be realized by using the switch device 140.

Figure 9:
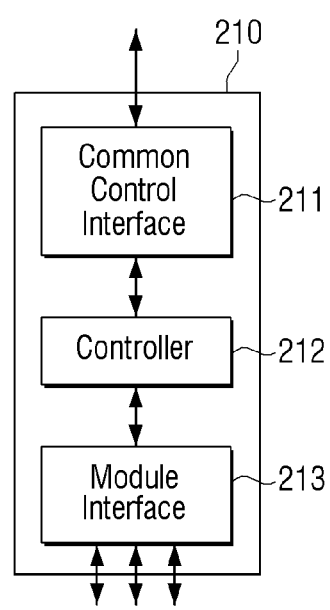
FIG. 9 is a block diagram illustrating a detailed structure of a module controller of a processor module according to an exemplary embodiment of the present general inventive concept.

FIG. 9 is a block diagram illustrating a detailed structure of a module controller 210 of a processor module 200 according to an exemplary embodiment of the present general inventive concept.

Referring to FIG. 9, the module controller 210 includes a common control interface 211, a controller 212, and a module interface 213.

The common control interface 211 is connected to the common interface bus 130 to receive and transmit a signal including at least one of a control command and data. The signal received by the common control interface 211 is transmitted to the controller 212.

The controller 212 converts the signal received through the common control interface 211 so that the signal corresponds to a predefined interface of the processor module 200. The controller 212 may convert a signal received from the CPU 220 into a signal corresponding to the common interface bus 130.

The predefined interface may be an interface corresponding to the BIU of the processor module 200 and may be determined according to a type of the CPU 220

The controller 212 drives firmware used to control the CPU 220 of the processor module 200 and controls components of the processor module 200.

The module interface 213 is connected to the CPU 220 and the storage device 230 to receive and transmit a signal corresponding to the predefined interface. In other words, the module interface 213 is connected to the BIU of the processor module 200 to transmit the signal to the CPU 220 and the storage device 230.

Figure 10:
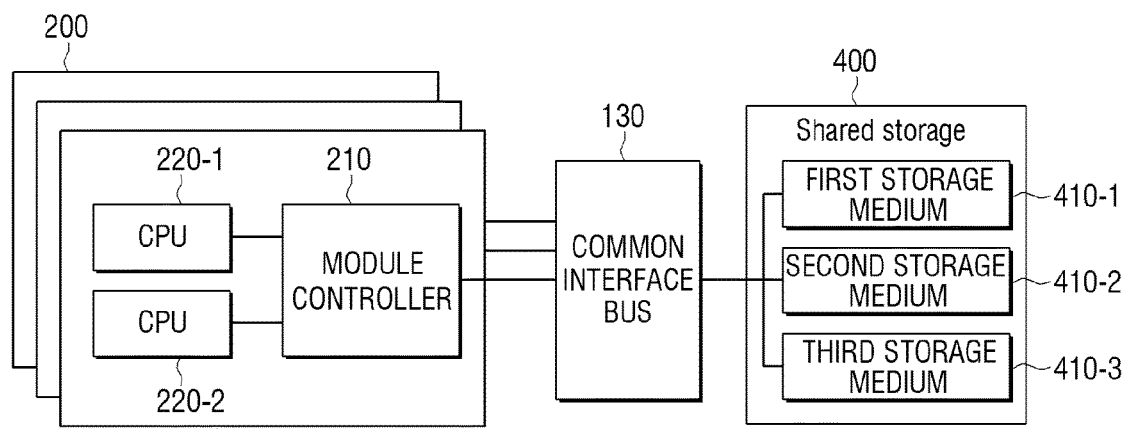
FIG. 10 is a block diagram illustrating a structure of a micro-server according to another exemplary embodiment of the present general inventive concept.

FIG. 10 is a block diagram illustrating a structure of a micro-sever according to another exemplary embodiment of the present general inventive concept.

Referring to FIG. 10, the micro-server 100 is a computer system which provides other computers with a service by using the plurality of processor modules 200-1 and 200-2, and includes a common interface bus 130 for connecting the plurality of processor modules to an external I/O device. In addition, the micro-server 100 exchanges data with the storage system 400 by using the aforesaid common interface bus 130.

The storage system 400 includes a plurality of storage mediums, and may provide the micro-server 100 with data stored in the plurality of storage mediums, or may store data provided by the micro-server 100 into the storage mediums.

To be specific, the storage system 400 includes a plurality of storage mediums 410-1, 410-2, and 410-3, and includes an I/O controller (not shown) for communication with the micro-server 100. The I/O controller may be connected to the micro-server 100 through a common interface scheme of the micro-server 100 (for example, PCI express).

Meanwhile, in describing FIG. 10, although it was described that the storage system 400 is a device which is separated from the micro-server 100, the storage system 400 may be implemented as a storage device within the micro-server 100.

Figure 11:
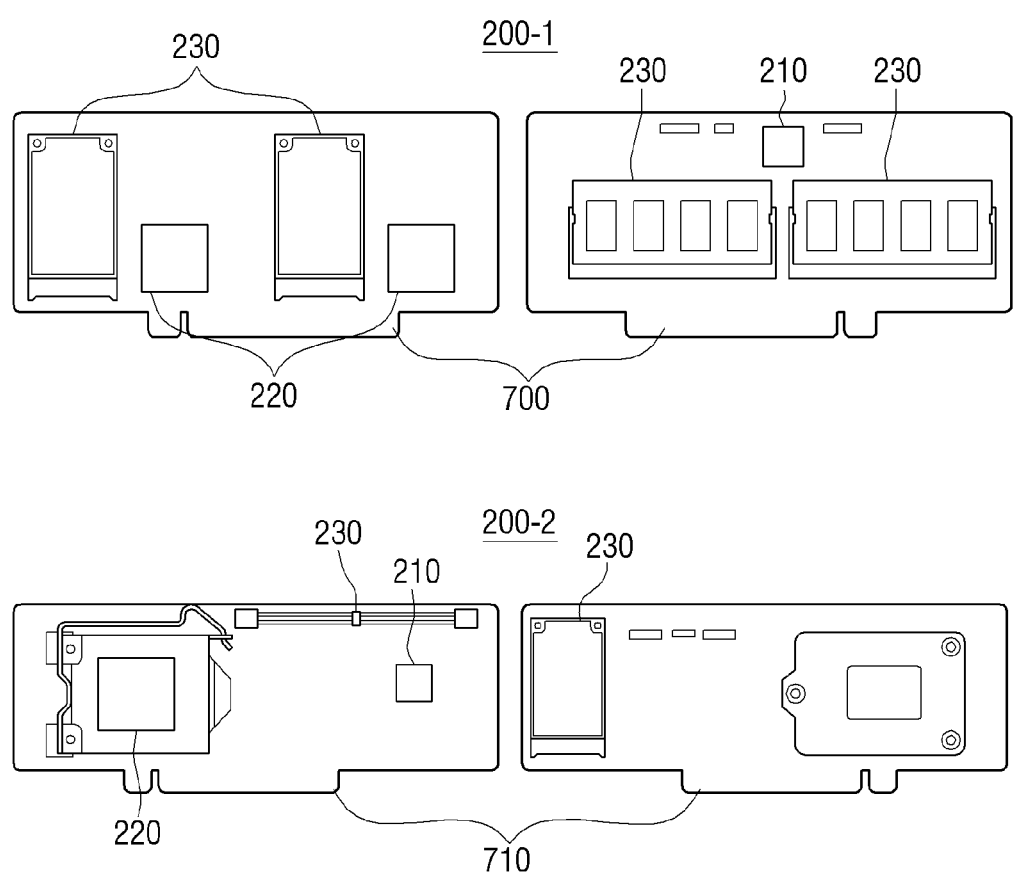
FIG. 11 is a view illustrating an appearance of a processor module according to an exemplary embodiment of the present general inventive concept.

FIG. 11 is a view illustrating an appearance of a processor module 200 according to an exemplary embodiment of the present general inventive concept.

Accordingly, FIG. 11 illustrates different types of processor modules 200-1 and 200-2.

Referring to FIG. 11, a storage device 230 and a CPU 220 are disposed on a front side of a first type of processor module 200-1, and a plurality of storage devices 230 and a module controller 210 are disposed on a back side of the first type of processor module 200-1

A hard disc drive (HDD) that is an element of the storage device 230 may be installed on the front side of the processor module 200-1. Also, a memory such as a random access memory/read only memory (RAM/ROM) may be installed on the back side of the processor module 200-1.

In a second type of processor module 200-2, a module controller 210, a CPU 220, and a storage device 230 are disposed on a front side of the second type of processor module 200-2, and a storage device 230 is disposed on a back side of the processor module 200-2.

A memory such as a RAM/ROM that is an element of the storage device 230 may be installed on the front side of the processor module 200-2, and a storage such as a HDD may be installed on the back side of the processor module 200-2.

Architectures of the first and second types of processor modules 200-1 and 200-2 may vary according to types of their CPUs. However, a slot and a form of connection pins 700 and 710 that are parts connected to the micro-server 100, respectively, may be similarly designed to be connected to one micro-server 100.

A configuration mentioned above is determined according to the common interface bus 130 of the micro-server 100 and enables various types of processor modules 200-1 and 200-2 to be physically connected to one micro-server 100.

Figure 12:
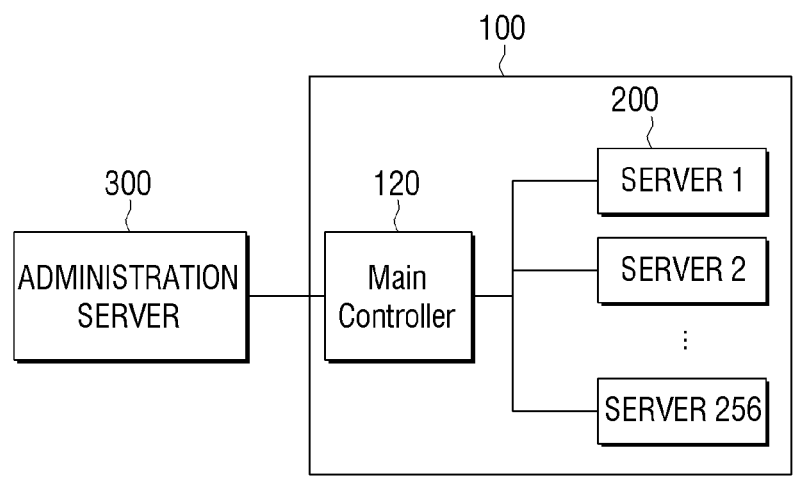
FIG. 12 is a block diagram illustrating a relation between a micro-server and a management server according to an exemplary embodiment of the present general inventive concept.

FIG. 12 is a block diagram illustrating a relation between the micro-server 100 and the administration server 300 according to an exemplary embodiment of the present general inventive concept.

The administration server 300 refers to a device that monitors and controls the micro-server 100 including a plurality of processor modules 200.

A user or an administrator monitors statuses of the plurality of processor modules 200 of the micro-server by using the administration server 300. The user or the administrator receives a control command of the micro-server 100 by using the administration server 300.

In detail, the administration server 300 communicates with a main controller 120 of the micro-server 100 to allow the user to set or select various functions supported by the micro-server 100 and to display various types of information provided by the micro-server 100. As such, a monitor and a mouse may be combined with each other to form the administration server 300, or the administration server 300 may be formed as a device that simultaneously senses an input and produces an output, such as a touch screen.

The administration server 300 and the micro-server 100 may be connected to each other through a Local Area Network (LAN) and the Internet or through a universal serial bus (USB) port.

The administration server 300 may include a storage unit to store status information of the plurality of processor modules 200 of the micro-server 100.

A global resource storage device will now be described in detail with reference to FIG. 13.

Figure 13:
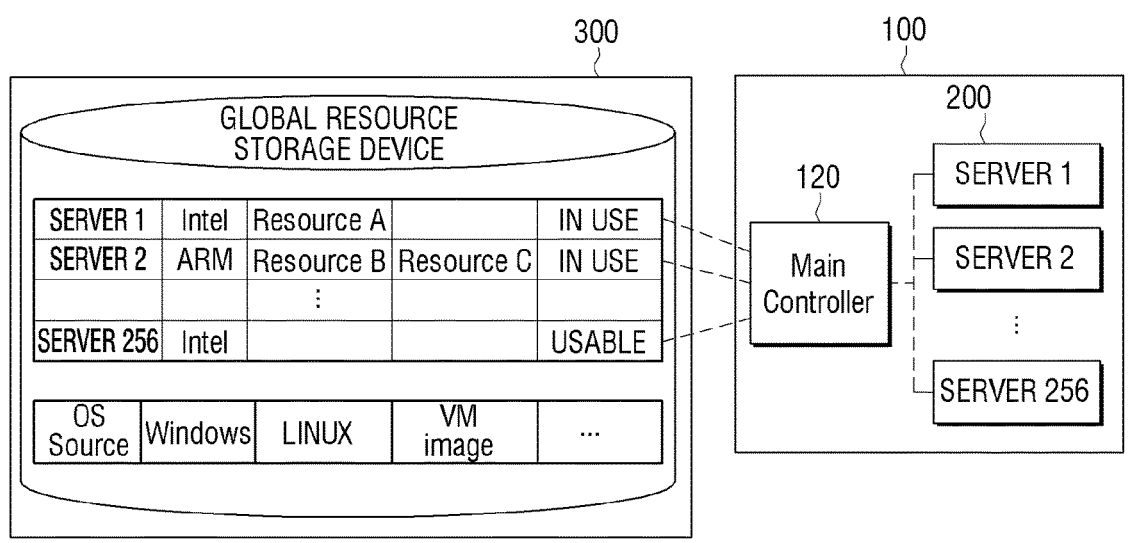
FIG. 13 is a view illustrating an operation of controlling a micro-server in a management server according to an exemplary embodiment of the present general inventive concept.

FIG. 13 is a view illustrating an operation of controlling the micro-server 100 in the administration server 300 according to an exemplary embodiment of the present general inventive concept.

Referring to FIG. 13, the administration server 300 includes the global resource storage device. The global resource storage device matches with the plurality of processor modules 200 to storage the status information of the plurality of processor modules 200.

In detail, the global resource storage device may store core architecture types, reserved resources, information about a use of the processor modules 200, etc. The status information may be information that is pre-input by the administrator or the user or information that is automatically collected from the micro-server 100.

The administrator or the user controls the micro-server by using the administration server 300. If the administrator or the user inputs a new job, the administrator or the user controls the micro-server to select the most appropriate processor module 200 from the plurality of processor modules 200 in order to perform the new job.

As described above, the user controls the micro-server 100 by using the administration server 300.

Figure 14:
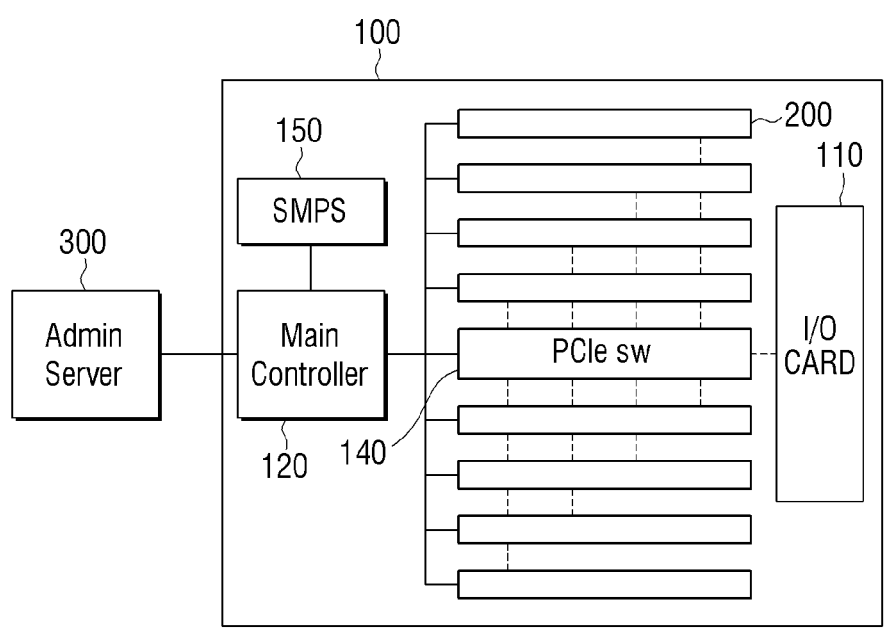
FIG. 14 is a block diagram illustrating a structure of a micro-server including a Switched Mode Power Supply (SMPS) part according to various exemplary embodiments of the present general inventive concept.

FIG. 14 is a block diagram illustrating a structure of the micro-server 100 including a switched mode power supply (SMPS) 150 according to an exemplary embodiment of the present general inventive concept.

Referring to FIG. 14, the micro-server 100 further includes the SMPS device 150.

The SMPS 150 refers to a power supply device that uses a switching circuit and selectively supplies power to elements of the micro-server 100.

The SMPS 150 supplies power according to used voltages and power consumptions of the processor modules 200 calculated by the main controller 120.

In detail, the main controller 120 receives the status information of the plurality of processor modules 200 to calculate the used voltages and the power consumptions of the processor modules 200. The SMPS 150 selectively supplies power to the processor modules 200 according to the used voltages and power consumptions of the processor modules 200.

For example, if a voltage of 5V is used by a first type of processor module including an Intel type CPU, and a voltage of 4.5V is used by a second type of processor module including an ARM type CPU, the main controller 120 controls the SMPS 150 to receive status information including used voltage information from the processor modules 200 and supply a voltage of 5V to the first type of processor module and a voltage of 4.5V to the second type of processor module.

Figure 15:
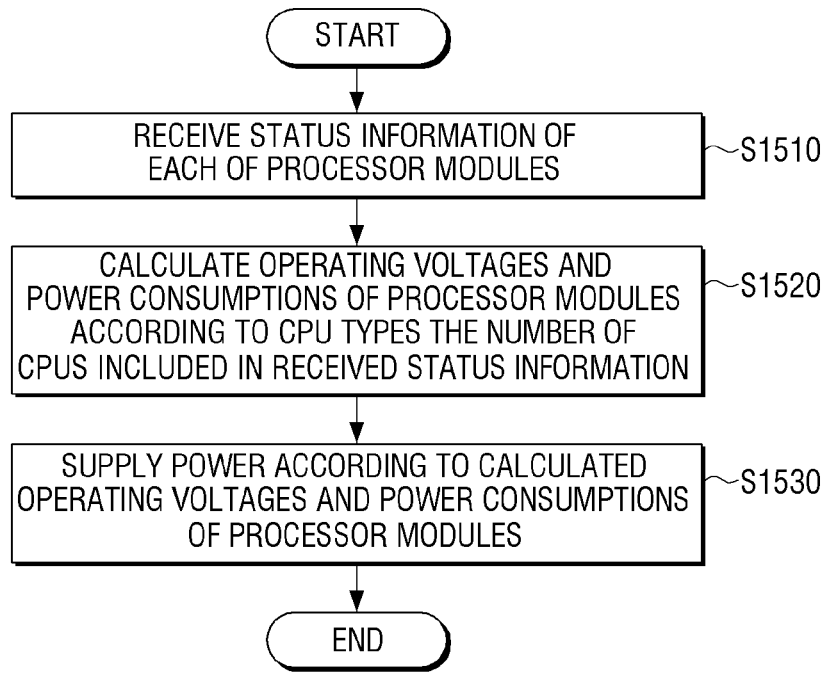
FIG. 15 is a flowchart illustrating an operation of controlling a processor module of a micro-server according to an exemplary embodiment of the present general inventive concept.

FIG. 15 is a flowchart illustrating an operation of controlling the processor modules 200 of the micro-server 100 according to an exemplary embodiment of the present general inventive concept.

Referring to FIG. 15, the micro-server 100 receives status information of processor modules 200 in operation S1510. Here, the status information of the processor modules 200 may include at least one of types of CPUs of the processor modules 200, the number of CPUs, and bootloader information.

In operation S1520, the micro-server 100 calculates used voltages and power consumptions of the processor modules 200 according to the types of CPUs and the number of CPUs included in the received status information.

In operation S1530, the micro-server 100 supplies power to the processor modules 200 according to the used voltages and the power consumptions of the processor modules 200.

According to the above-described controlling operation, appropriate power is supplied to different types of processor modules 200.

Figure 16:
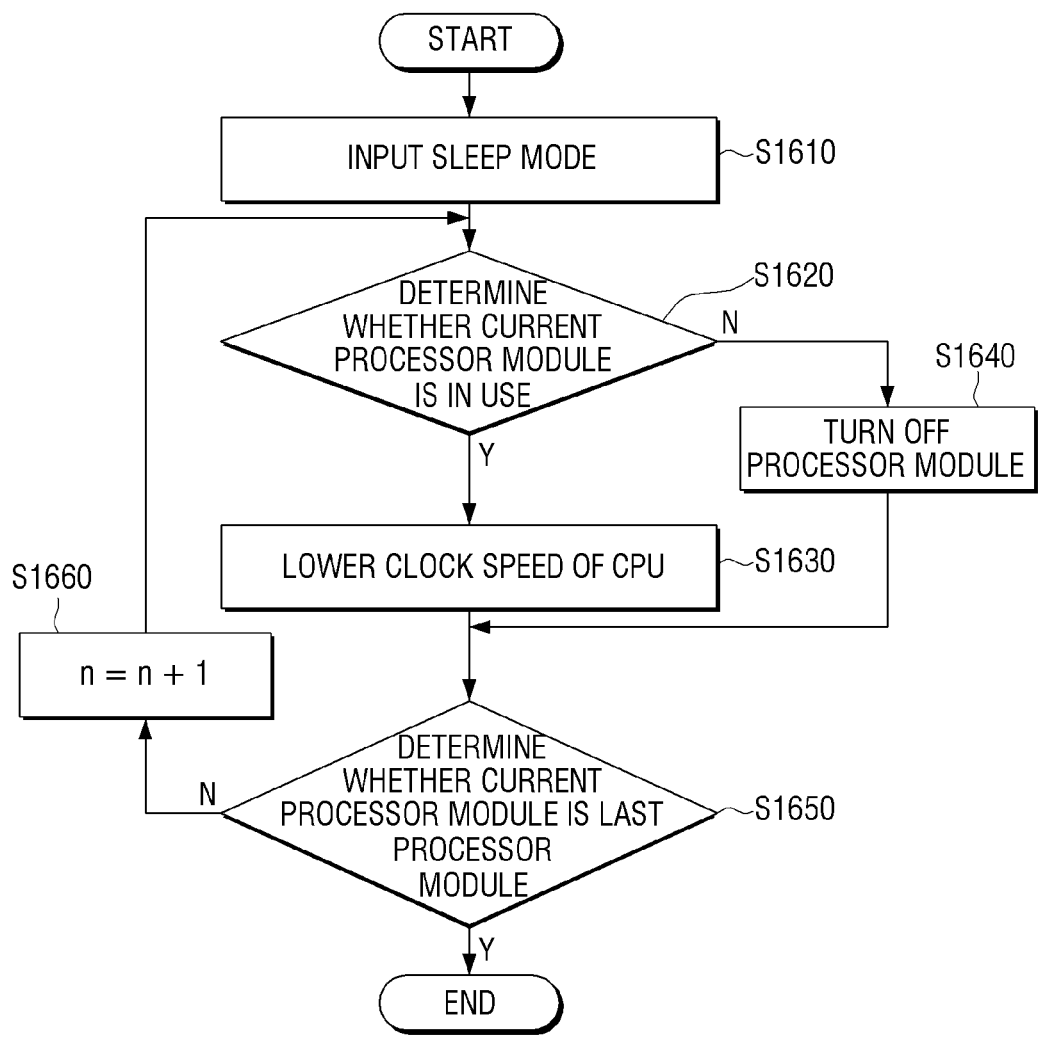
FIG. 16 is a flowchart illustrating a power saving mode operation of a micro-server according to an exemplary embodiment of the present general inventive concept.

FIG. 16 is a flowchart illustrating a sleep mode operation of the micro-server 100 according to an exemplary embodiment of the present general inventive concept.

Referring to FIG. 16, in operation S1610, a sleep mode control command is input into the micro-server 100. In operation S1620, the micro-server 100 determines whether a first processor module is in use. The sleep mode control command may be input through the administration server 300 or may input if a preset condition of the micro-server 100 is satisfied.

If it is determined that the first processor module is in use (S1620: YES), the micro-server 100 controls to reduce a clock speed of a CPU of the first processor module in operation S1630.

If it is determined that the first processor module is not in use (S1620: NO), the micro-server 100 controls to cut off power of the first processor module or supply a minimum amount of power to the first processor module in operation S1640.

In operation S1250, the micro-server 100 determines whether the first processor module is a last processor module. If it is determined that the first processor module is not the last processor module (S1250: NO), the micro-server 100 repeats the above-described process by using a next processor module in operation S1660.

The micro-server 100 performs a sleep mode function according to the above-described process.

Figure 17:
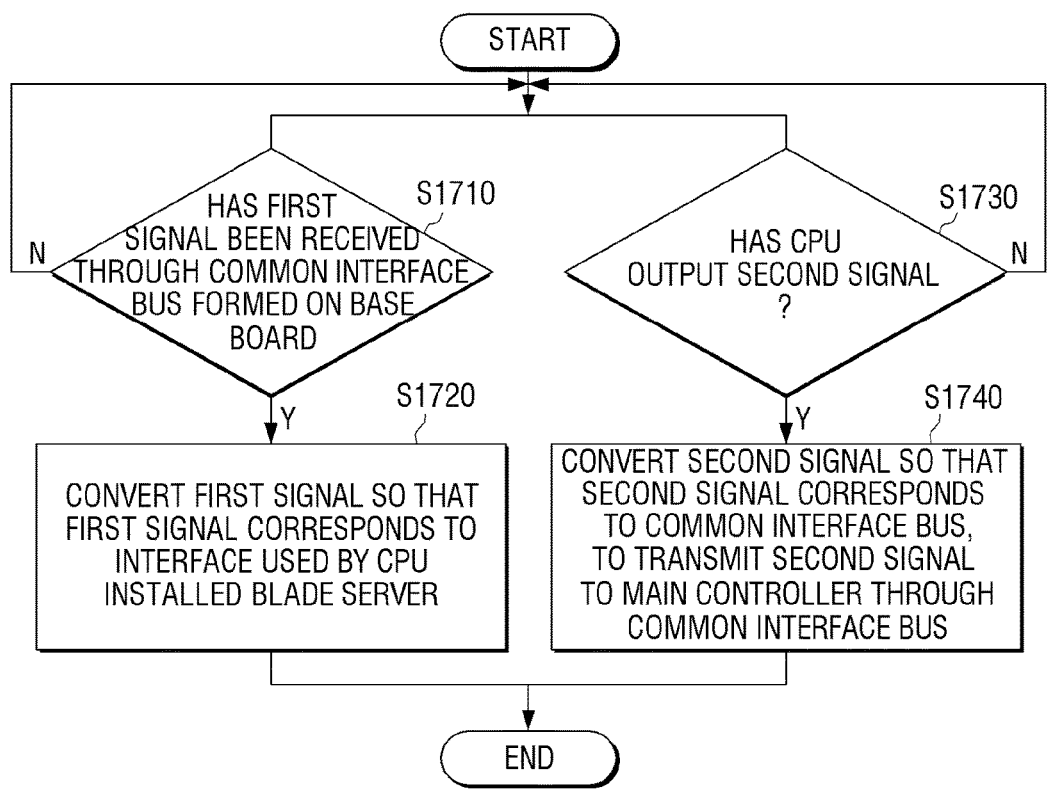
FIG. 17 is a flowchart illustrating a method of using a processor module according to an exemplary embodiment of the present general inventive concept.

FIG. 17 is a flowchart illustrating a method of using a processor module according to an exemplary embodiment of the present general inventive concept.

Referring to FIG. 17, a module controller of the processor module determines that whether a first signal has been received through a common interface bus formed on a base board. If it is determined that the module controller has received the first signal (S1710: YES), the module controller converts the first signal so that the first signal corresponds to an interface used by the CPU of the processor module and transmits the converted first signal to the CPU in operation S1720.

In operation S1740, a determination is made as to whether the CPU has output a second signal. If it is determined that the CPU has output the second signal (S1730: YES), the module controller converts the second signal so that the second signal corresponds to a common interface bus and transmits the converted second signal to a main controller.

Here, the common interface bus may be an interface bus which supports at least one of an $i^2c$ interface and a PCI-Express interface.

The method of FIG. 17 may be performed by the micro-server 100 having the structure described with reference to FIG. 1 and the processor module 200 having the structure described with reference to FIG. 2 or by micro-servers and processor modules having other structures.

A method of using a processor module of a micro-server including a processor module according to an exemplary embodiment of the present general inventive concept as described above enables various types of processor modules to be used in one micro-server.

Methods according to various exemplary embodiments may be programmed and stored on various types of storage media. Therefore, the above-described methods according to the various exemplary embodiments may be realized in various types of micro-servers and processor modules which execute the storage media.

The above-described method of using the processor module may be realized as a program including an executable algorithm which may be executed by a module controller. The program may be stored on a non-transitory computer-readable medium to be provided.

The non-transitory computer readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A processor module that is installable on a base board of a micro-server, the processor module comprising:
   at least one storage device;
   at least one central processing unit (CPU) that uses a preset interface;
   a module controller to relay a connection between a common interface bus formed on the base board and an interface used by the CPU allowing different types of processor modules having different types of CPUs to be used; and
   a DSP (Digital Signal Processor) and/or a GPU (Graphics Processing Unit) which performs a predefined calculation according to control of the CPU, and provides the CPU with the calculated result.

2. The processor module of claim 1, wherein:
   the module controller converts a signal received through the common interface bus so that the signal corresponds to the preset interface and converts a signal received from the CPU so that the signal corresponds to the common interface bus; and
   the common interface bus is an interface bus commonly connect a main controller formed on the base board to a plurality of different types of processor modules.

3. The processor module of claim 1, wherein the module controller comprises:
   a common control interface connected to the common interface bus to receive and transmit a signal comprising at least one of a control command and data;
   a controller to convert a signal received through the common interface bus so that the signal corresponds to the preset interface and converts a signal received from the CPU so that the signal corresponds to the common interface bus; and a module interface connected to the CPU and the storage device to receive and transmit a signal corresponding to the preset interface.

4. The processor module of claim 1, wherein the common interface bus is an interface bus to support at least one of an Inter-Integrated circuit (i$^2$c) interface and a peripheral component interconnect (PCI)-Express interface.

5. A micro-server comprising:
a main controller;
a base board on which the main controller is mounted;
a common interface bus formed on the base board; and
a plurality of different types of processor modules installed on the base board to be connected to the main controller through the common interface bus,
wherein the plurality of processor modules respectively comprise a module controller to relay connections between the common interface bus and an interface used by CPUs (central processing units) mounted in the processor modules allowing different types of processor modules having different types of CPUs to be used,
wherein at least one of the plurality of processor modules further comprises a DSP (Digital Signal Processor) and/or a GPU (Graphics Processing Unit) which performs a predefined calculation according to the control of the CPU, and provides the CPU with the calculated result.

6. The micro-server of claim 5, wherein the module controllers convert a signal received through the common interface bus so that the signal corresponds to the interface and convert a signal received from the CPUs so that the signal corresponds to the common interface bus.

7. A micro-server comprising:
a main controller;
a base board on which the main controller is mounted;
a common interface bus formed on the base board; and
a plurality of different types of processor modules installed on the base board to be connected to the main controller through the common interface bus,
wherein the plurality of processor modules respectively comprise a module controller to relay connections between the common interface bus and an interface used by CPUs (central processing units) mounted in the processor modules,
wherein the common interface bus is an interface bus to support at least one of an i$^2$cI (Inter-Integrated Circuit Interface) Interface and a PCI (Peripheral Component Interconnect)-Express interface.

8. The micro-server of claim 5, wherein the plurality of processor modules are designed so that slots and forms of connection pins are equal.

9. The micro-server of claim 5, wherein the main controller receives status information from the plurality of processor modules.

10. The micro-server of claim 9, wherein the status information comprises at least one of types of the CPUs of the processor modules, the number of CPUs, bootloader information,
wherein the main controller transmits the status information to an administration server.

11. The micro-server of claim 9, further comprising:
a Switched Mode Power Supply (SMPS) to selectively supply power to elements of the micro-server,
wherein the main controller controls the SMPS to calculate used voltages and power consumptions of the processor modules by using the status information and supply power according to the used voltages and the power consumptions of the processor modules.

12. A micro-server comprising:
a main controller;
a base board on which the main controller is mounted;
a common interface bus formed on the base board; and
a plurality of different types of processor modules installed on the base board to be connected to the main controller through the common interface bus,
wherein the plurality of processor modules respectively comprise a module controller to relay connections between the common interface bus and an interface used by CPUs (central processing units) mounted in the processor modules,
an Input/Output (I/O) device comprising at least one I/O card which receives and transmits data with an external device; and
a switch device to selectively connect the I/O device to the plurality of processor modules.

13. The micro-server of claim 12, wherein the switch device comprises PCI-Express switch circuits to selectively adjust connection relations between the plurality of processor modules and the at least one I/O card.

14. The micro-server of claim 5, wherein the main controller receives a control command from the administration server to control the plurality of processor modules.

15. The micro-server of claim 14, wherein if a sleep mode command is received from the administration server, the main controller controls to cut off power of the processor modules of the plurality of processor modules which are not used and to reduce clock speeds of CPUs of the processor modules which are used.

16. The micro-server of claim 5, wherein the common interface bus is connected to a storage system including at least one storage device, and relays connections between each of the plurality of processor modules and the storage system.

17. A method of using a processor module of a micro-server comprising a based board on which a main controller is mounted, a common interface bus formed on the based board, and the processor module installed on the base board to be connected to the common interface bus, the method comprising:
if a module controller of the processor module receives a first signal through the common interface bus formed on the base board, converting the first signal so that the first signal corresponds to an interface used by a CPU (central processing unit) mounted in the processor module and transmitting the converted first signal to the CPU to relay a connection between the common interface bus and the interface allowing different types of processor modules having different types of CPUs to be used; and
if the CPU outputs a second signal, converting the second signal so that the second signal corresponds to the common interface bus, through the module controller and transmitting the converted second signal from the module controller to the main controller through the common interface bus,
wherein the common interface bus is an interface bus which supports at least one of an i$^2$c Inter-Integrated Circuit interface and a PCI Peripheral Component Interconnect Express interface.

18. A non-transitory computer-readable recording medium executing a method of a micro-server comprising a based board on which a main controller is mounted, a common interface bus formed on the based board, and the processor module installed on the base board to be connected to the common interface bus, the method comprising:

if a module controller of the processor module receives a first signal through the common interface bus formed on the base board, converting the first signal so that the first signal corresponds to an interface used by a CPU (central processing unit) mounted in the processor module and transmitting the converted first signal to the CPU; and if the CPU outputs a second signal, converting the second signal so that the second signal corresponds to the common interface bus and transmitting the converted second signal from the module controller to the main controller through the common interface bus to relay a connection between the common interface bus and the interface allowing different types of processor modules having different types of CPUs to be used, wherein the common interface bus is an interface bus which supports at least one of an $i^2c$ Integrated Circuit interface and a PCI Peripheral Component Interconnect Express interface.

* * * * *